United States Patent
Ohmi et al.

[11] Patent Number: 5,904,381
[45] Date of Patent: May 18, 1999

[54] FLUID COUPLING

[75] Inventors: Tadahiro Ohmi, Sendai; Tsutomu Shinohara, Osaka; Michio Yamaji, Osaka; Nobukazu Ikeda, Osaka; Keiji Hirao, Osaka, all of Japan

[73] Assignees: Ohmi,Tadahiro, Miyagi; Fujikin Incorporated, both of Osaka, Japan

[21] Appl. No.: 08/949,431

[22] Filed: Oct. 14, 1997

[30] Foreign Application Priority Data

Oct. 15, 1996 [JP] Japan .................................. 8-272021

[51] Int. Cl.⁶ ..................................................... F16L 25/00
[52] U.S. Cl. ............................ 285/328; 285/38; 285/379; 285/917
[58] Field of Search ..................................... 285/379, 380, 285/336, 328, 38, 422, 910, 917

[56] References Cited

U.S. PATENT DOCUMENTS 4,294,477  10/1981  Ahlstone .
5,145,219  9/1992  Babuder .
5,149,148  9/1992  Taeuber et al. ................... 285/379 X
5,409,270  4/1995  Shinohara et al. ..................... 285/379

FOREIGN PATENT DOCUMENTS 0 567 924  11/1993  European Pat. Off. .
507 468   9/1930   Germany .
6011079   1/1994   Japan ................................... 285/379

*Primary Examiner*—David W. Arola
*Attorney, Agent, or Firm*—Armstrong, Westerman, Hattori, McLeland & Naughton

[57] ABSTRACT

Each of two coupling members is formed in an abutting end face thereof with a recessed portion for accommodating a gasket and a retainer therein, and the recessed portion has a retainer holding hollow cylindrical portion formed centrally on a bottom surface thereof and provided on an end face thereof with an annular projection for clamping the gasket. The gasket comprises a small portion and a large portion having a greater outside diameter than the small portion. The retainer is attached to the cylindrical portion of the coupling member with which the gasket small portion is in contact.

5 Claims, 5 Drawing Sheets

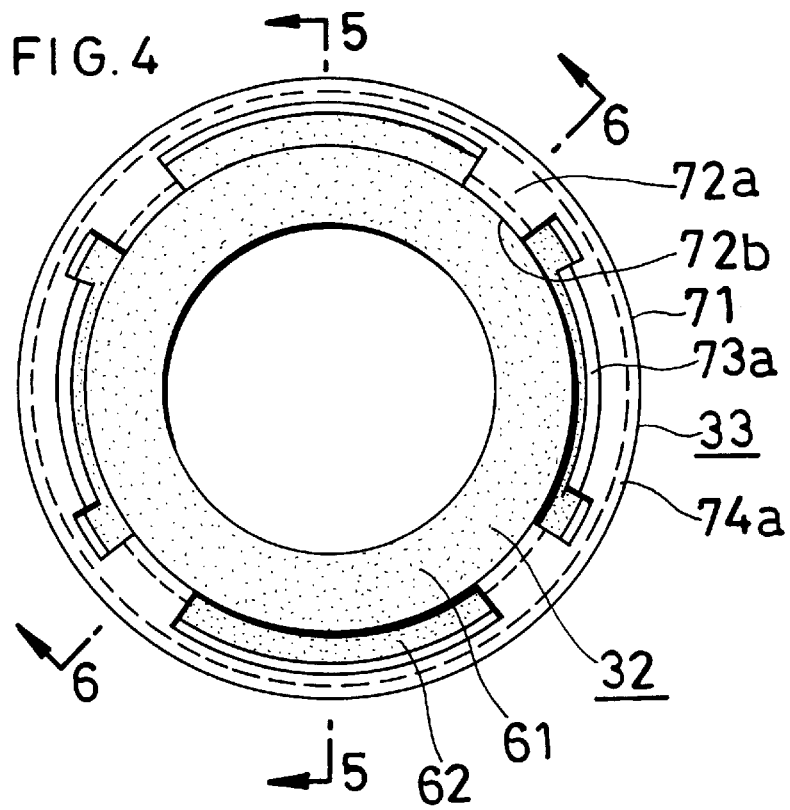
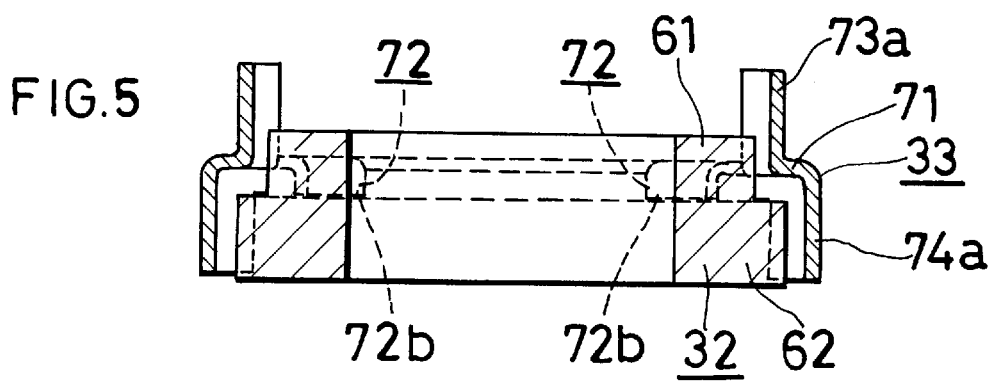
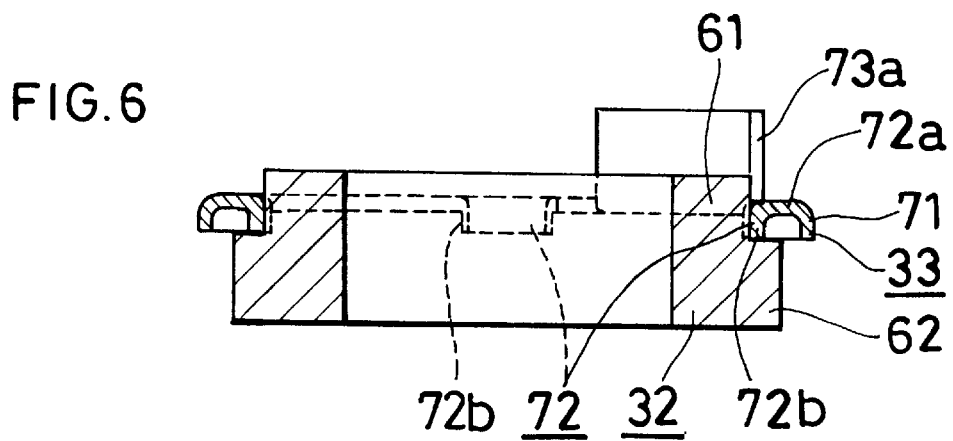

FLUID COUPLING

BACKGROUND OF THE INVENTION

The present invention relates to fluid couplings, and more particularly to a fluid coupling for use in fluid control devices for manufacturing semiconductors, the fluid coupling being useful for interconnecting massflow controllers, on-off valves, and connecting blocks interposed between these devices.

Fluid control devices for use in manufacturing semiconductors comprise a regulator such as massflow controller for controlling the rate of flow or a pressure regulator, and an on-off valve in combination with the regulator. It is known to connect the massflow controller to the on-off valve by a suitable connecting block as a preferred arrangement (see JP-A No. 326943/1996). FIG. 10 shows the construction of a fluid coupling included in the arrangement.

With reference to FIG. 10, the fluid coupling comprises a male coupling member 91 having an abutting end face formed with a hollow cylindrical fitting projection 95, a female coupling member 92 having a fitting recessed portion 96 circular in cross section and formed in a fitting end face thereof, an annular gasket 93 interposed between the two coupling members 91, 92, and a retainer 94 for holding the outer periphery of the gasket 93 to hold the gasket 93 to the female coupling member 92. The projection 95 of the male coupling member 91 is formed in its projecting end with a gasket accommodating annular cavity 100. The circular recessed portion 96 of the female coupling member 92 has a retainer holding cylindrical portion 97 formed in its projecting end with a gasket accommodating annular cavity 101. The bottom surfaces of the caved portions 100, 101 are formed with gasket clamping annular projections 98, 99, respectively.

Each of the coupling members 91, 92 may be a connecting block, massflow controller main body or a block joined to the on-off valve. One of these coupling members 91, 92 is of the male type, and the other member is of the female type The fitting projection 95 of the male coupling member 91 is fitted in the recessed portion 96 of the female coupling member 92, whereby the members 91, 92 are prevented from shifting radially relative to each other. The retainer 94, holding the gasket 93, is attached to the cylindrical portion of the female coupling member 92 to ensure a sealing function.

The conventional fluid coupling described includes two types of coupling members, i.e., male and female, so that when these members are to be joined, each member needs to be identified to distinguish the orientation thereof for the joint. The joining procedure therefore takes much time, while when the orientation of the joint is to be reversed, there arises a need to use additional coupling members of reverse male-female relationship.

If the distinction between the male and female types is eliminated, the advantage of preventing radial displacement by the fitting engagement is no longer available, with the result that the female coupling member 92 becomes radially shiftable relative to the male coupling member 91 In the case of the female coupling member 92 having the gasket-holding retainer 94 fitted around its cylindrical portion 97, the gasket clamping projection 99 thereof is unlikely to become radially displaced relative to the gasket 93, whereas with the male coupling member 91 to which the retainer 94 is not attached, the gasket clamping projection 98 thereof is liable to shift radially relative to the gasket 93. Consequently, this gives rise to the problem that the clamping projection 98 becomes released from the gasket end face to impair the seal.

This type of fluid coupling further has the problem of permitting leakage of fluid when subjected to a bending force. Additionally, for the coupling to be suitable to uses of which a very high degree of cleanliness is required as in manufacturing semiconductors, a problem still remains to be solved as to what configuration is to be given to the gasket clamping annular projections.

SUMMARY OF THE INVENTION

An object of the present invention is to eliminate the distinction between the male end female types of coupling members and to provide a fluid coupling which is prevented from impairment of the sealing function due to shifting or displacement.

Another object of the invention to provide a fluid coupling which will not permit the leakage of fluid even if subjecting to a bending force.

Still another object of the invention is to provide a fluid coupling having gasket clamping annular projections of optimized shape.

The present invention provides a fluid coupling comprising a first coupling member and a second coupling member each having a fluid channel, an annular gasket provided between the two coupling members, and a retainer for holding an outer periphery of the gasket to hold the gasket to one of the coupling members, the fluid coupling being characterized in that each of the coupling members is formed in an abutting end face thereof with a recessed portion for accommodating the gasket and the retainer therein, the recessed portion having a retainer holding hollow cylindrical portion formed centrally on a bottom surface thereof and provided on an end face thereof with an annular projection for clamping the gasket, the gasket comprising a small portion and a large portion having a greater outside diameter than the small portion, the retainer being attached to the cylindrical portion of the coupling member with which the gasket small portion is in contact.

With the fluid coupling of the invention, the retainer can be attached to either one of the first and second coupling members, so that the coupling members can be joined to each other without the necessity of distinguishing the male coupling member from the female coupling member. The retainer is attached to the coupling member with which the small portion of the gasket is in contact, whereby the gasket can be accurately positioned relative to the annular projection of this coupling member. The large portion of the gasket is fitted to the other coupling member in bearing contact therewith, so that even if the annular projection of the other coupling member shifts radially relative to the gasket, the annular projection is less likely to become released from the gasket end face in corresponding relation with the greater area of this gasket end face. This precludes the impairment of the sealing function.

Preferably, the inner edge part of the end face of each cylindrical portion is adapted to come into intimate contact with the inner edge part of the end face of the gasket when the fluid coupling is completely tightened up. No cavity or clearance trapping a liquid then remains between each cylindrical portion and the gasket.

More preferably, the fluid coupling is so adapted that when the fluid coupling is completely tightened up, each annular projection is in pressing contact with the gasket end face, with the abutting end faces of the coupling members in contact with each other, each at a portion thereof radially outward of the recessed portion. When so designed, the fluid coupling as completely tightened up has an increased area of contact including the area of contact between the gasket and the coupling members plus the area of contact between the coupling members, consequently ensuring fluid-tightness even if subjected to an external bending force.

More preferably, the end face of each cylindrical portion includes an inner flat face inward of the annular projection and an outer flat face outward of the annular projection, the inner flat face projecting beyond the outer flat face axially of the cylindrical portion, the inner flat face of each cylindrical portion being adapted to come into contact with the gasket end face before the abutting end faces of the coupling members come into contact with each other at the radially outward portions.

Preferably, each annular projection is positioned radially outward of the inner periphery of the cylindrical portion and has in section a contour comprising a circular-arc portion extending radially outward from the end face of the cylindrical portion, and a straight portion continuous with the circular-arc portion, the circular-arc portion having a center radially inward of a junction of the circular-arc portion and the straight portion, the straight portion being inclined at an angle of 30 to 60 degrees with respect to an axis of the cylindrical portion. When the screws for the coupling members are tightened, the annular projection of each coupling member first presses the end face of the gasket opposed thereto, and the inner edge part of cylindrical portion end face of each coupling member comes into intimate contact with the inner edge part of the gasket end face to provide a seal. Although the gasket deforms most greatly at the position where the annular projection is provided, this position is not at the inner edge of the gasket end face but outward of the inner edge, so that the gasket portion deforming most greatly is outward of the inner edge. Consequently, the inner peripheral portion of the gasket is unlikely to crease and will not permit deposition of dust or extraneous matter. The inclined straight portion included in the contour of the projection obviates the difficulty to be encountered in removing the gasket when the fluid coupling is disassembled, if the contour includes an axially extending straight portion. Moreover, an alteration in the reaction to be perceived by the hand during tightening can be recognized more readily in this case than when the projection is in the form of a circular arc in its entirety. Thus, the projection of the specified contour has the respective advantages of the projection having a circular-arc contour only and the projection having an axially extending straight portion in its contour. If the inclination is smaller than 30 degrees, there arises the problem to be experienced with the axially extending straight portion, i.e. the drawback that the gasket is difficult to remove, whereas the inclination, if greater than 60 degrees, entails the drawback of the entirely circular-arc contour that an altered reaction is difficult to perceive. Accordingly, the inclination is preferably 30 to 60 degrees, more preferably about 45 degrees.

BRIEF DESCRIPTION OF THE DRAWINGS

FIG. 4 is a view showing the retainer with the gasket held thereto, as the retainer is seen from one side thereof having a coupling member holder;

FIG. 5 is a view in section taken along the line 5—5 in FIG. 4;

FIG. 6 is a view in section taken along the line 6—6 in FIG. 4;

DESCRIPTION OF THE PREFERRED EMBODIMENTS

Embodiments of the present invention will be described below with reference to the drawings.

Figure 1:
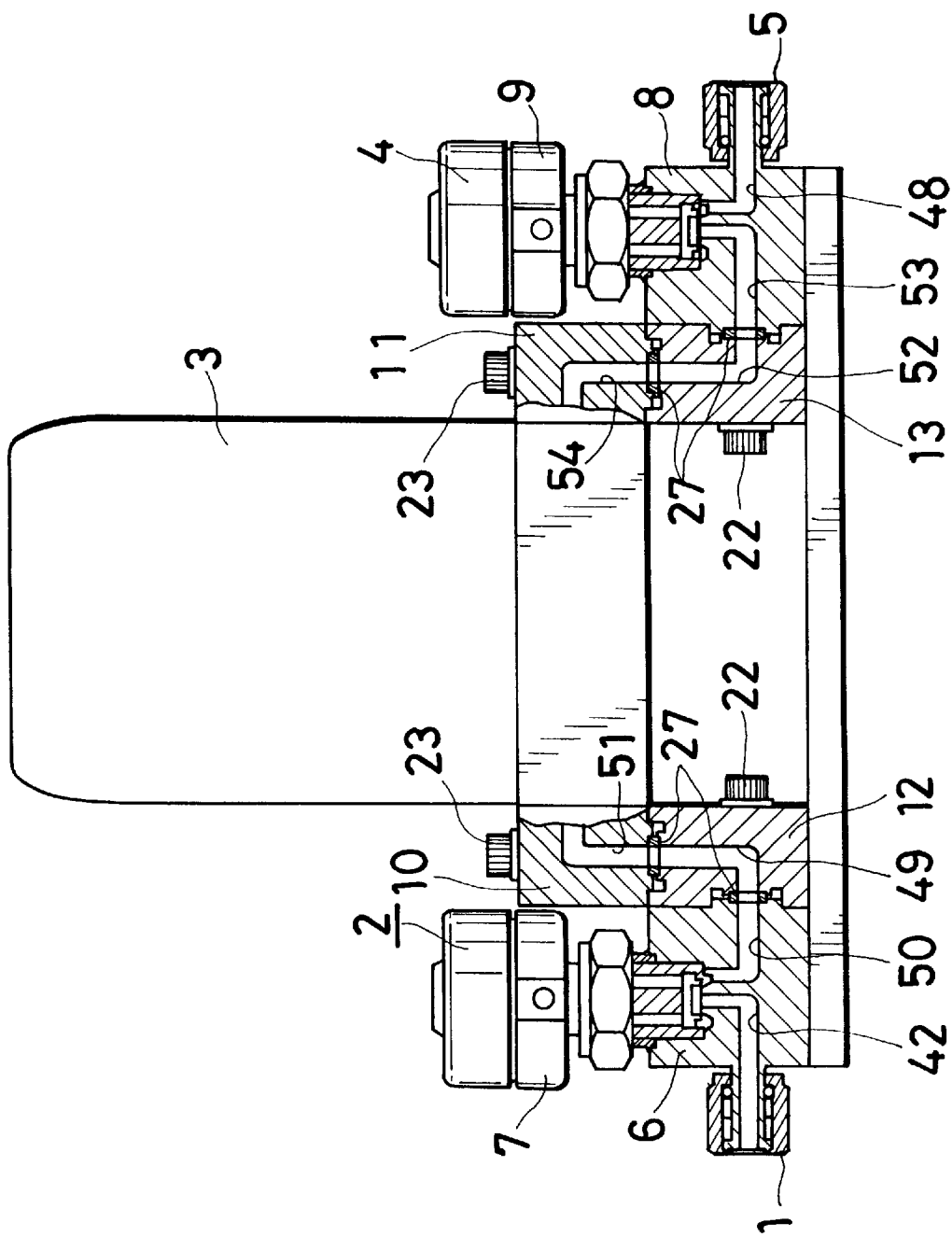
FIG. 1 is a front view partly broken away and showing an example of fluid control device having fluid couplings embodying the invention.

The terms "upper," "lower," "left" and "right" as herein used refer respectively to the upper, lower, left and right sides of FIG. 1. The terms "upper" and "lower" are used for convenience of description; the illustrated device may be installed as turned upside down or in a lateral position.

FIG. 1 shows a fluid control device wherein retainers of the invention are used for fluid couplings. The device comprises, as arranged from left rightward, a fluid inlet portion 1, first on-off valve 2, massflow controller (regulator) 3, second on-off valve 4 and fluid outlet portion 5. The first on-off valve 2 comprises a blocklike body 6 having a leftwardly opened inlet channel 42 and a rightwardly opened outlet channel 50, and an actuator 7 for blocking or permitting communication between the two channels 42, 50. Similarly, the second on-off valve 4 comprises a blocklike body 8 having a leftwardly opened inlet channel 53 and a rightwardly opened outlet channel 48, and an actuator 9 for blocking or permitting communication between the two channels 53, 48.

The regulator 3 is provided at the left and right sides of its lower end portion with left and right upper channel blocks 10, 11 as projected leftward and rightward. The left upper channel block 10 is formed with a downwardly opened inlet channel 51 in communication with an inlet channel (not shown) of the regulator 3. The right upper channel block 11 has a downwardly opened outlet channel 54 in communication with an outlet channel (not shown) of the regulator 3. Although not shown, the channel blocks 10, 11 are fixed to the regulator 3 with screws driven in sideways.

Left and right lower channel blocks 12, 13 are provided beneath the left and right upper channel blocks 10, 11, respectively. The right face of the body 6 of the first on-off valve 2 is in contact with the left face of the left lower channel block 12, and the left face of the body a of the second on-off valve 4 with the right face of the right lower channel block 13.

The left lower channel block 12 is formed with an inlet channel 49 for holding the rightwardly opened outlet channel 50 of the first on-off vale 2 in communication with the downwardly opened inlet channel 51 of the left upper channel block 10. The right lower channel block 13 has an outlet channel 52 for holding the downwardly opened outlet channel 54 of the right upper channel block 11 in communication with the leftwardly opened inlet channel 53 of the second on-off valve 4.

The body 6 of the first on-off valve 2 is joined to the left lower channel block 12 with screws 22 driven into the block 12 from the right side thereof. Similarly, the body 8 of the second on-off valve 4 is joined to the right lower channel block 13 with screws 22 driven into the block 13 from the left side thereof. Furthermore, the upper channel blocks 10, 11 are joined to the respective lower channel blocks 12, 13 with screws 23 driven in from above the blocks 10, 11.

A fluid coupling 27 is provided at each of a plurality of locations, i.e., between the body 6 of the first on-off valve 2 and the left lower channel block 12, between the body 8 of the second on-off valve 4 and the right lower channel block 13, between the upper channel blocks 10, 11 and the respective lower channel blocks 12, 13 and between the regulator 3 and the left and right upper blocks 10, 11.

Figure 2:
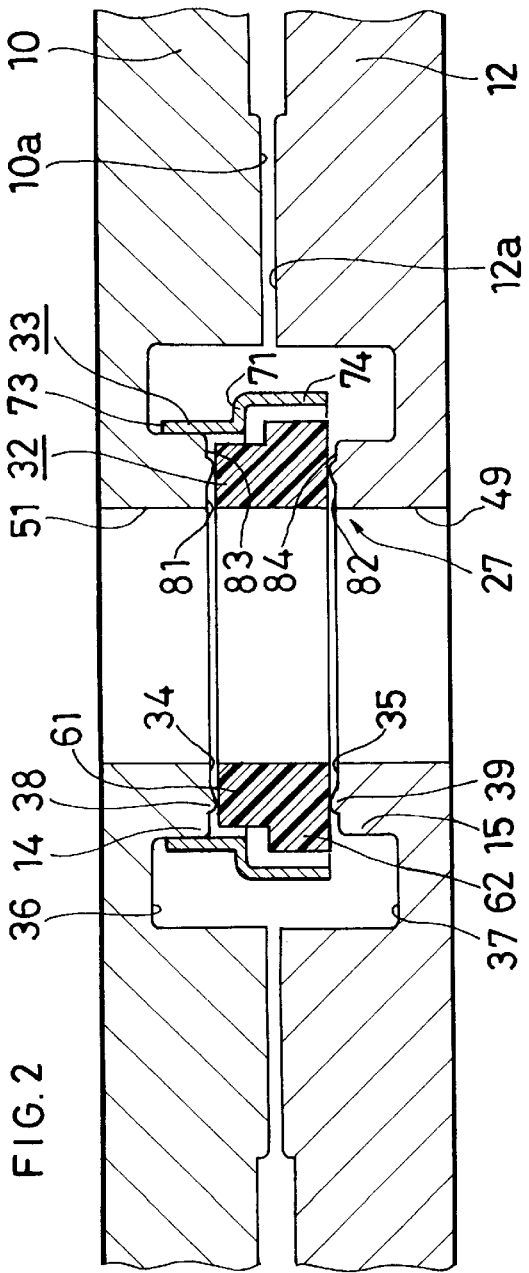
FIG. 2 is an enlarged view in section of the fluid coupling shown in FIG. 1.

With reference to FIG. 2, the fluid coupling 27 will be described which is provided between the left upper channel block (hereinafter referred to as the "first coupling member") 10 and the left lower channel block (hereinafter referred to as the "second coupling member") 12 having the inlet channels (fluid channels) 51, 49, respectively.

The fluid coupling 27, which is adapted to hold the joint of the first and second coupling members 10, 12 fluid-tight, comprises abutting end faces of these members 10, 12 which are so shaped as will be described below, an annular gasket 32 interposed between the two coupling members 10, 12, a retainer 33 holding the outer periphery of the gasket 32 for holding the gasket 32 to the first coupling member 10 according to the illustrated embodiment, and screw means 23 for fastening the two coupling Members 10, 12 together.

The first and second coupling members 10, 12 are formed in their abutting end faces with respective gasket accommodating portions 34, 35 which are recessed by approximately one-half of the thickness of the gasket 32 respectively from reference faces 10a, 12a each included in the corresponding end face and projecting most greatly therefrom, and with respective retainer accommodating annular recessed portions 36, 37 disposed around the recessed portions 34, 35 and having a deeper bottom face than the portions 34, 35. The gasket accommodating recessed portions 34, 35 are formed on their bottom surfaces with respective annular projections 38, 39 for clamping the gasket 32. The first and second coupling members 10, 12 are identical in shape with respect to these recessed portions 34, 35, retainer accommodating recessed portions 36, 37 and annular projections 38, 39. The bottom surface of each recessed portion 34 (35) and the inner peripheral surface of each recessed portion 36 (37) form a retainer holding hollow cylindrical portion 14 (15) which has the gasket clamping annular projection 38 (39) at its projecting end. The bottom surface of the gasket accommodating recessed portion 34 (35), i.e., the end surface of the cylindrical portion 14 (15), is divided into an inner flat face 81 (82) positioned radially inwardly of the annular projection 38 (39) and approximately perpendicular to the axis of the channel portion 51 shown in FIG. 2, and an outer flat face 83, (84) positioned radially outwardly of the annular projection 38 (39) and approximately perpendicular to the axial direction. The inner flat face 81 (82) is slightly (about 0.02 mm) projected beyond the outer flat face 83 (84) axially of the channel portion 51.

The gasket 32 is made of stainless steel, has an inside diameter equal to the diameter of the channels 51, 49 of the coupling members 10, 12 and comprises a small portion 61 and a large portion 62 having a larger outside diameter than the small portion 61.

The retainer 33 is made from stainless steel as an integral piece. As shown in greater detail in FIGS. 3 to 6, the retainer 33 comprises a ring 71 serving as a skeleton, a gasket holder 72 for holding the outer periphery of the gasket 32, a coupling member holder 73 for holding an end portion of the first coupling member 10, and a handle 74 for permitting fingers to hold the retainer with ease.

The ring 71 is L-shaped in section and so adapted as not to deform diametrically when held by a force of fingers.

The gasket holder 72 comprises four gasket holding claws 72a projecting radially inward from the inner periphery of the ring 71 and equidistantly spaced apart along the ring. Each of the claws 72a is slightly resilient and has an axially bent inner end, and the inner surface of the bent portion 72b is adapted to elastically press the outer periphery of the small portion 61 of the gasket 32, whereby the gasket 32 is prevented from moving inside the retainer 33 radially and axially thereof. When the gasket 32 is fitted into the retainer 33, the large portion 62 of the gasket 32 bears against the holding claws 72a and is thereby retained in position, This eliminates the likelihood of the gasket 32 slipping off the retainer 33.

The coupling member holder 73 comprises two coupling member holding lugs 73a radially extending from the inner ends of two edge portions 71a opposed to each other and radially inwardly projecting from the inner periphery of the ring 71. Each of the holding lugs 73a is larger than the gasket holding claw 72a and positioned between the adjacent two claws 72a, with a small clearance formed between the lug and each claw. The two lugs 73a, which are slightly resilient, elastically hold therebetween the outer periphery of the retainer holding cylindrical portion 14 of the first coupling member 10, whereby the retainer 33 is held to the first coupling member 10.

The handle 74 comprises two handle pieces 74a each formed on the ring 71 at the outer periphery of the portion thereof provided with the holding lug 73a and projecting in an axial direction opposite lo the lug 73a.

When the two handle pieces 74a are held with fingers and forced radially inward, the force deforms each holding lug 73a radially outward as supported at the portion of the ring 71 at the junction of the lug 73a and the handle piece 74a. Thus, the lugs 73a are opened, permitting the retainer 33 to be attached to the coupling member 10 with ease. When the handle pieces 74a are released from the fingers after the retainer 33 is attached to the coupling member 10, the lugs 73a return to the original state, elastically holding the cylindrical portion 14 of the coupling member 10. When the elastic force is given en appropriate value, the coupling member 10 can be effectively held.

Figure 7:
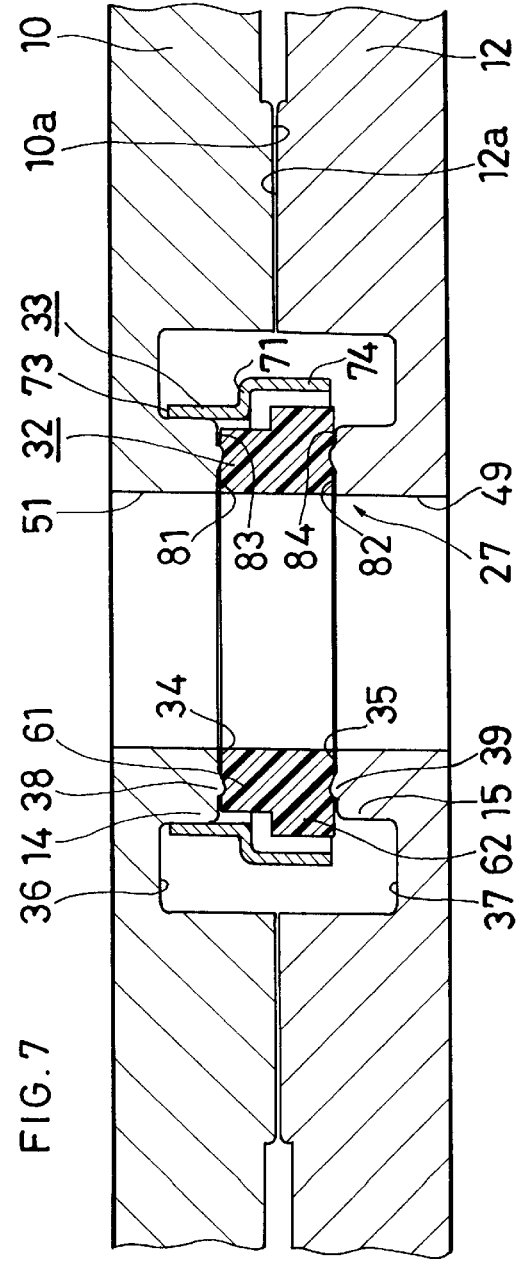
FIG. 7 is an enlarged view in section of the fluid coupling shown in FIG. 2 to illustrate a state of the coupling while it is being tightened up.
Figure 3:
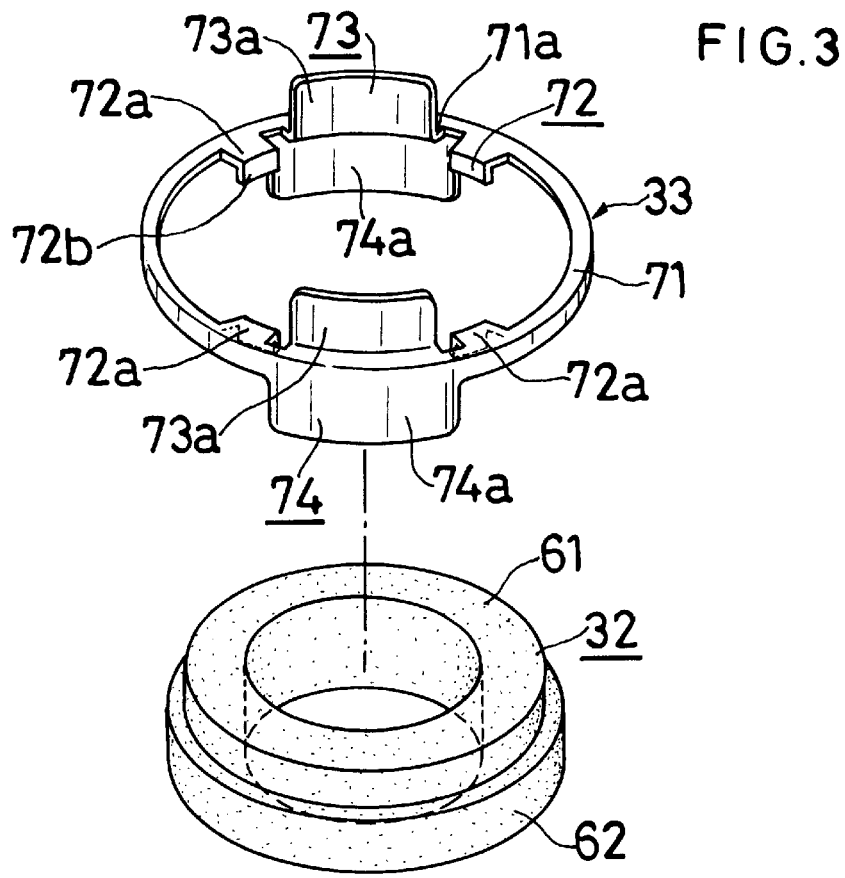
FIG. 3 is an exploded perspective view showing a retainer and a gasket.
Figure 10:
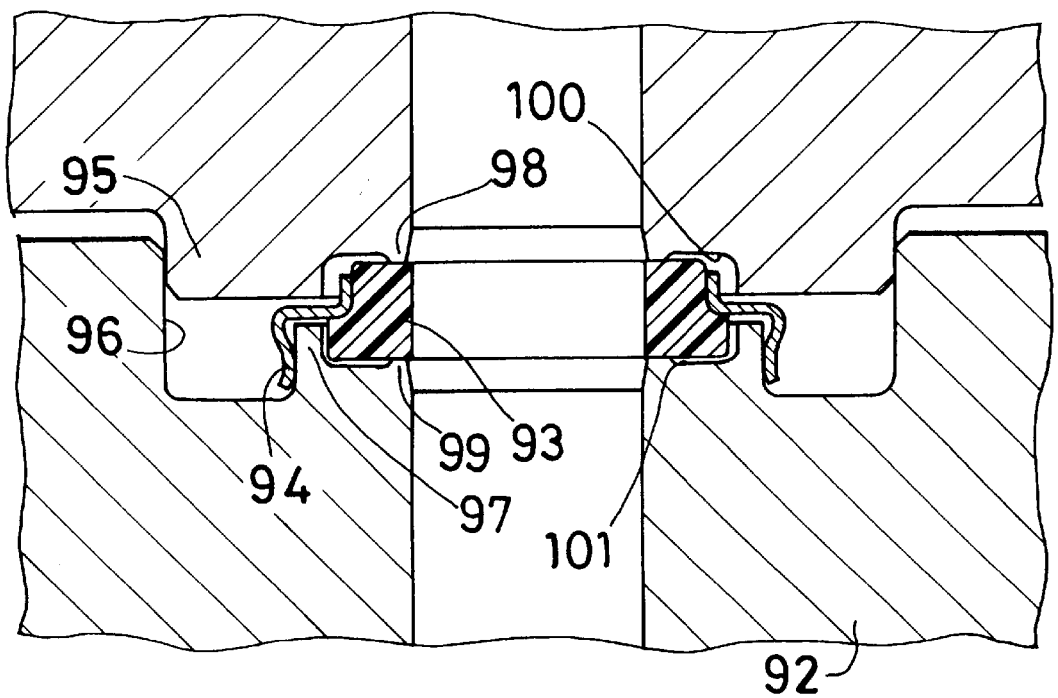
FIG. 10 is an enlarged view in section of a conventional fluid coupling.

FIG. 2 shows the first and second coupling members 10, 12 as fastened together by manually tightening up the screws 23 for these members. In this state, the gasket clamping annular projections 38, 39 only are in bearing contact with the gasket 32, with a clearance remaining between each end face of the gasket 32 and the inner flat face 81 (82), opposed thereto, of the recessed portion 34 (35) of the coupling member 10 (12), as well as between the reference faces 10a, 12a of abutting end faces of the two coupling members 10, 12 The clearance between each gasket end face and the inner flat face 81 (82) opposed thereto is 0.1 mm, and the clearance between the reference faces 10a, 12a is 0.22 mm. Accordingly, when the screws are tightened with a spanner from the state shown in FIG. 2, the inner flat faces 81, 82 first come into contact with the respective end faces of the gasket 32, whereupon the gradient of the tightening torque alters to give a perceivable reaction to the hand. FIG. 7 shows this state. In this state, a clearance still remains between the reference faces 10a, 12a of the two coupling members 10, 12 as seen in FIG. 7. The reference faces 10a, 12a come into contact with each other when the screws 23 are further tightened up. The variation in the gradient of the tightening torque occurring at this time can be made greater than the variation in the gradient of the tightening torque produced upon the inner flat faces 81, 82 of the gasket accommodating recessed portions 34, 35 coming into contact with the respective end faces of the gasket 32, by giving a greater area to the reference faces 10a, 12a than to the inner flat faces 81, 82. The reference faces 10a, 12a of abutting end faces of the coupling members 10, 12 then act as a stopper, preventing further tightening. Further the increase of the stopper area results in enhanced flexural strength. Even in this state, there remains a clearance of 0.01 mm between the outer flat face 83 (84) of the gasket accommodating recessed portion 34 (35) of the coupling member 10 (12) and each gasket end face. The proper tightening range is from the position where the inner flat faces 81, 82 come into contact with the respective faces of the gasket 32 to the position where the reference faces 10a, 12a come into contact with each other.

With the fluid coupling 27 described, the retainer 33 is capable of holding either one of the first and second coupling members 10, 12, so that in assembling the fluid control device shown in FIG. 1, the components 3, 6, 8, 10, 11, 12, 13 can be joined or connected to one another regardless of whether the abutting end face of each component is of the male type or female type. The retainer 33 is adapted to hold the retainer holding cylindrical portion 14 of the first coupling member 10 with which the small portion 61 of the gasket 32 is in contact, whereby the gasket 32 can be accurately positioned in place relative to the gasket clamping projection 38 of the first coupling member. It is likely that the coupling members 10, 12 will shift relative to each other in a direction perpendicular to the axis (misalignment of their axes) when the screws 23 are tightened, shifting the gasket clamping projection 39 of the second coupling member 12 relative to the gasket 32, whereas the large portion 62 of the gasket 32 is adapted for contact with the second coupling member 12, and the projecting 39 is less likely to become released from the gasket end face 32 which has a larger area, even in the event of such shifting, consequently preventing impairment of the seal due to shifting or displacement. The deformation of the gasket 32 occurring when the fluid coupling 27 is tightened up is absorbed by the deformation of the four gasket holding claws 72a, with the result that the coupling member holder 73 remains unaffected, effectively holding the retainer 33 to the coupling member 10 without impairment. These effects are sustained also when the fluid coupling 27 as disassembled is assembled again to assure the coupling of the sealing function.

The number of claws 72a, lugs 73a or handle pieces 74a in the foregoing embodiment is not limited to the number mentioned.

Figure 8:
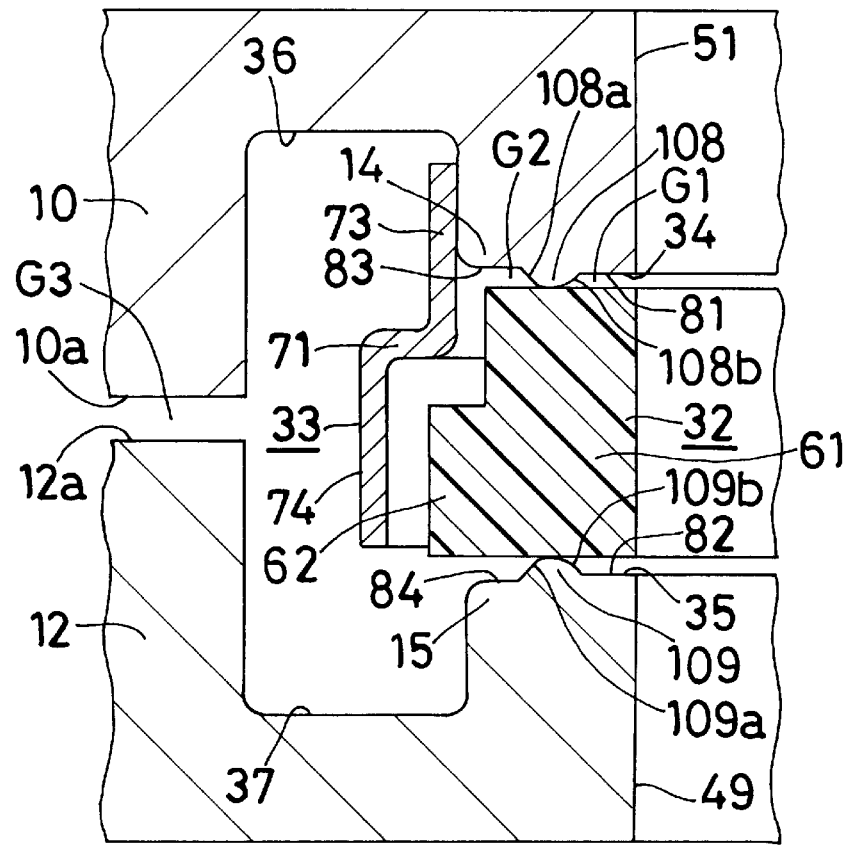
FIG. 8 is an enlarged fragmentary view in section showing a projection of preferred shape when nuts are manually tightened.
Figure 9:
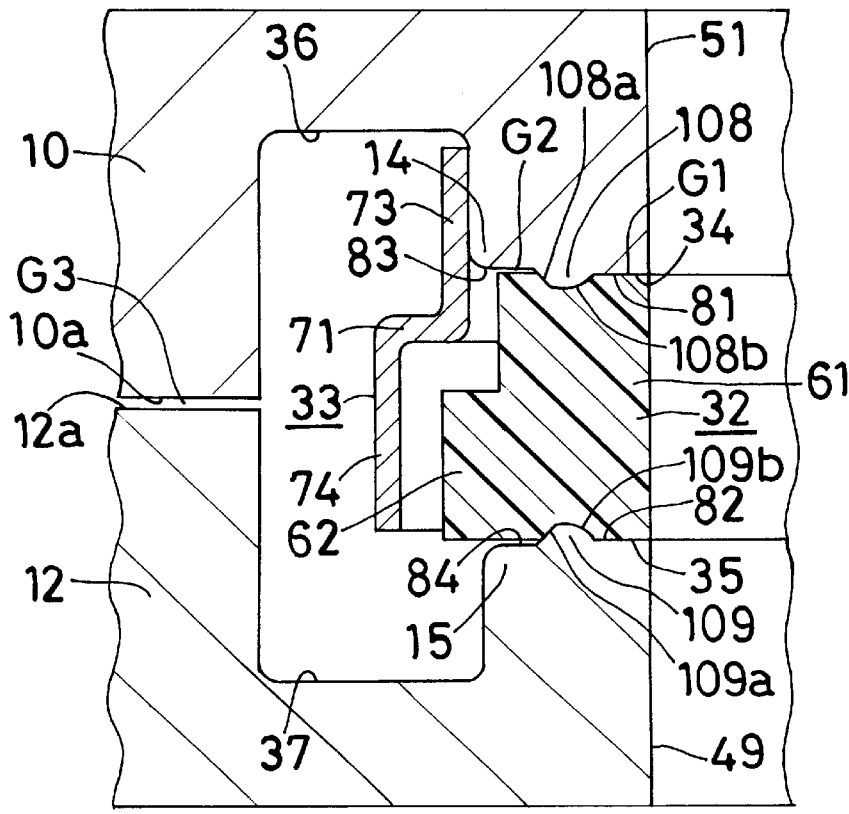
FIG. 9 is a view of the assembly of FIG. 8 as further tightened up.

FIGS. 8 and 9 show gasket clamping annular projections 108, 109 of preferred shape for use in the fluid coupling of the invention. In section, each of the annular projections 108, 109 has a contour which comprises a circular-arc portion 108b (109b) radially extending from the inner flat face 81 (82) of each coupling member 10 (12), and a straight portion 108a (109a) connecting the circular-arc portion 108b (109b) to the outer flat face 83 (84) included in the abutting end face of each coupling member 10 (12). The circular arc of the portion 108b (109b) is centered about a point positioned radially inward of the junction of the circular-arc portion 108b (109b) and the straight portion 108a (109a). The straight portion 108a (109a) is inclined at an angle of 45 degrees with respect to the axis of the cylindrical portion 14 (15).

FIG. 8 shows the coupling on an enlarged scale when the screws 23 are manually tightened. As the screws 23 are tightened, the extremity of each annular projection 108 (109) first comes into contact with the end face of the gasket 32 opposed thereto as seen in the drawing. At this time, an inner clearance G1 is present between the inner flat face 81 (82) of each coupling member 10 (12) and the gasket end face opposed thereto, and an outer clearance G2 greater than the clearance G1 is present between the outer flat face 83 (84) of each coupling member 10 (12) and the gasket end face. Furthermore, a still greater clearance G3 is present between the reference faces 10a, 12a of abutting end faces of the coupling members 10, 12. Thus, G1<G2<G3. As the screws 32 manually tightened are further tightened with a spanner or the like, the gasket 32 deforms, reducing the inner clearance G1 to zero first as seen in FIG. 9. The outer clearance G2 is not zero at this time. When the screws are properly tightened, the outer clearance G2 diminishes also to zero, with the inner flat faces 81, 82 in intimate contact with the inner edge parts of the respective end faces of the gasket 32 and with the inner peripheries of the coupling members 10, 12 approximately flush with the inner periphery of the gasket 32. As a result, a clearance or cavity that would trap a liquid no longer remains. The clearance G3 between the reference faces 10a, 12a of abutting end faces of the coupling members 10, 12 has not diminished to zero even at this time. When the screws are further tightened up, this clearance G3 reduces to zero, offering greatly increased resistance to tightening to prevent overtightening.

Although the gasket 32 deforms most greatly at the position where each annular projection 108 (109) is provided, this position is not at the inner edge of the gasket end face but outward of the inner edge, so that the gasket portion deforming most greatly is outward of the inner edge. Consequently, the inner peripheral portion of the gasket is unlikely to crease and will not permit deposition of dust or extraneous matter.

The gasket 32 and the annular projections 108, 109 are so dimensioned that when the tightening torque has reached a proper value, the clearances G1, G2, between the gasket 32 and the inner and outer flat feces 81, 82 and 83, 84 disappear. For example, the height of each annular projection 108 (109) from the inner flat face 81 (82) is 0.1 mm, the radius of the circular arc is 0.5 mm, and the outer flat face 83 (84) is recessed from the inner flat face 81 (82) by 0.02 mm.

With the annular projection 108 (109) having the straight portion 108a (109a) which is inclined with a respect to the axial direction, the tightening torque markedly increases relative to the angle of rotation of the screw 23 upon the outer flat face 83 (84) coming into contact with the gasket 32, with the result that the worker can manifestly recognize the variation in the torque, i.e., alteration in the reaction. On the other hand, when the contour of the annular projection in section is circular arc and has no straight portion, the tightening torque increases at an approximately constant rate relative to the angle of rotation of the screw, and it is difficult to perceive an alteration in the reaction. Thus, the annular projection 108 (109) having the inclined straight portion 108a (109a) is more advantageous than otherwise in that the completion of tightening can be recognized from an alteration in the reaction perceived. In the case of an annular projection having a straight portion extending in the axial direction, axially shifting the gasket 32 relative to the coupling member 10 (12) involves a great frictional force. This gives rise to the problem that gasket 32 is difficult to remove from the coupling members 10, 12 in disassembling the coupling. In contrast, the annular projection 108 (109) having the axially inclined straight portion 108a (109a) is generally equivalent to the annular projection with a circular-arc contour having no straight portion and is completely free of the problem that the gasket 32 is difficult to remove from the coupling member 10 (12) in disassembling the coupling. The projection 108 (10) of the coupling shown in FIGS. 8 and 9 therefore has the respective advantages of the project ion having a circular-arc portion only and the projection having an axially extending straight portion, and is optimized in configuration.

What is claimed is:

1. A fluid coupling comprising a first coupling member and a second coupling member each having a fluid channel, an annular gasket provided between the two coupling members, and a retainer for holding an outer periphery of the gasket to hold the gasket to one of the coupling members, the fluid coupling being characterized in that each of the coupling members is formed in an abutting end face thereof with a recessed portion for accommodating the gasket and the retainer therein, the recessed portion having a retainer holding hollow cylindrical portion formed centrally on a bottom surface thereof and provided on an end face thereof with an annular projection for clamping the gasket, and tightening means for moving said annular projections into clamping engagement with said gasket, the gasket comprising a small portion and a large portion having a greater outside diameter than the small portion, the retainer being attached to the cylindrical portion of the coupling member with which the gasket small portion is in contact.

2. A fluid coupling according to claim 1 wherein an inner edge part of the end face of each cylindrical portion comes into intimate contact with an inner edge part of an end face of the gasket when the fluid coupling is completely tightened up.

3. A fluid coupling according to claim 2 wherein each annular projection is positioned radially outward of an inner periphery of the cylindrical portion and has in section a contour comprising a circular-arc portion extending radially outward from the end face of the cylindrical portion, and a straight portion continuous with the circular-arc portion, the circular-arc portion having a center radially inward of a junction of the circular-arc portion and the straight portion, the straight portion being inclined at an angle of 30 to 60 degrees with respect to an axis of the cylindrical portion.

4. A fluid coupling according to claim 2 wherein when the fluid coupling is completely tightened up, each annular projection is in pressing contact with the gasket end face, and the abutting end faces of the coupling members are in contact with each other, each at a portion thereof radially outward of the recessed portion.

5. A fluid coupling according to claim 4 wherein the end face of each cylindrical portion includes an inner flat face inward of the annular projection and an outer flat face outward of the annular projection, the inner flat face projecting beyond the outer flat face axially of the cylindrical portion, the inner flat face of each cylindrical portion being adapted to come into contact with the gasket end face before the abutting end faces of the coupling members come into contact with each other at the radially outward portions.

\* \* \* \* \*